United States Patent
Moita et al.

(10) Patent No.: US 11,074,106 B2
(45) Date of Patent: Jul. 27, 2021

(54) SORTING TASKS WITH DEPENDENCIES AND RESOURCE SHARING

(71) Applicant: SAP SE, Walldorf (DE)

(72) Inventors: Gabriel Moita, São Leopoldo (BR); Daniel Bossle, Porto Alegre (BR)

(73) Assignee: SAP SE, Walldorf (DE)

( * ) Notice: Subject to any disclaimer, the term of this patent is extended or adjusted under 35 U.S.C. 154(b) by 142 days.

(21) Appl. No.: 16/458,691

(22) Filed: Jul. 1, 2019

(65) Prior Publication Data

US 2021/0004263 A1    Jan. 7, 2021

(51) Int. Cl.
| | |
|---|---|
| *G06F 9/48* | (2006.01) |
| *G06F 8/60* | (2018.01) |
| *G06F 8/61* | (2018.01) |
| *G06F 8/65* | (2018.01) |

(52) U.S. Cl.
CPC .............. *G06F 9/4881* (2013.01); *G06F 8/60* (2013.01); *G06F 8/65* (2013.01); *G06F 9/48* (2013.01); *G06F 9/485* (2013.01); *G06F 9/4806* (2013.01); *G06F 9/4843* (2013.01); *G06F 8/61* (2013.01)

(58) Field of Classification Search
CPC ..... G06F 8/60; G06F 8/61; G06F 8/65; G06F 9/48; G06F 9/4806; G06F 9/4843; G06F 9/485; G06F 9/4881
See application file for complete search history.

(56) References Cited

U.S. PATENT DOCUMENTS

| | | | |
|---|---|---|---|
| 8,522,083 B1 | 8/2013 | Cohen et al. | |
| 9,032,370 B2 | 5/2015 | Chakraborty et al. | |
| 10,229,040 B2 | 3/2019 | Gentile et al. | |
| 10,754,709 B2 * | 8/2020 | Jain | G06F 9/4881 |
| 2005/0154559 A1 | 7/2005 | Jager et al. | |
| 2008/0066061 A1 | 3/2008 | Gellerich | |
| 2008/0184241 A1 * | 7/2008 | Headrick | G06F 9/4843 718/102 |
| 2014/0229221 A1 * | 8/2014 | Shih | G06Q 10/06312 705/7.23 |
| 2015/0169432 A1 | 6/2015 | Sinyagin et al. | |
| 2015/0261657 A1 | 9/2015 | Kommineni et al. | |
| 2016/0098292 A1 * | 4/2016 | Boutin | G06F 9/505 718/104 |

(Continued)

OTHER PUBLICATIONS

Eghbali, S. and Tahvildari, L., "Test Case Prioritization Using Lexicographical Ordering," IEEE Transactions On Software Engineering, vol. 42, No. 12, pp. 1178-1195, Dec. 2016.

(Continued)

*Primary Examiner* — Charles M Swift

(74) *Attorney, Agent, or Firm* — Sterne, Kessler, Goldstein & Fox P.L.L.C.

(57) ABSTRACT

Disclosed herein are system, method, and computer program product embodiments for resolving an execution order for a plurality of tasks, such as solving complex calculations in order, installing new software in order, or scheduling instructions by compilers in order. The approach uses a dependency graph to perform a topological sort, and applies a heuristic to determine which node to execute next from remaining nodes without dependency issues. The approach favors reducing resource conflicts with a resource used by a previous node, resolving larger numbers of dependencies early, and forcing early resolution of resource conflicts.

17 Claims, 20 Drawing Sheets

(56) References Cited

U.S. PATENT DOCUMENTS

2016/0314065 A1   10/2016   Chirgwin et al.
2017/0308411 A1*  10/2017   Brill ...................... G06F 9/5044
2018/0173563 A1*   6/2018   Hu ........................ G06F 9/5027
2018/0276040 A1*   9/2018   Hosmani .................. G06F 9/50

OTHER PUBLICATIONS

Fazlalizadeh, Y. et al., "Prioritizing Test Cases for Resource Constraint Environments Using Historical Test Case Performance Data," IEEE International Conference on Computer Science and Information Technology, pp. 190-195, Jan. 2009.

Guizzo, G. et al., "A Hyper-Heuristic for the Multi-Objective Integration and Test Order Problem," GECCO '15, 8 pages, Jul. 11-15, 2015.

Kahn, A.B., "Topological Sorting of Large Networks," Communications of the ACM, pp. 558-562, Jan. 1962.

Khan, S.U.R. et al., "An Analysis of the Code Coverage-based Greedy Algorithms for Test Suite Reduction," SDIWC, ISBN: 978-0-9891305-2-3, pp. 370-377, Nov. 2013.

Maashi, M. et al., "A Multi-objective Hyper-heuristic based on Choice Function," available at http://www.cs.nott.ac.uk/~pszeo/docs/publications/HH_CF_AM.pdf, 51 pages, Jul. 2014.

Russell, S., et al., "Constraint Satisfaction Problems," in Artificial intelligence: A Modern Approach, 2nd edition, Prentice Hall, available at http://aima.cs.berkeley.edu/2nd-ed/newchap05.pdf, pp. 137-155, 2002.

* cited by examiner

200

202 L = {0, 1, 9, 2, 7, 3, 10}
204 S = {4, 5}

200

202 L = {0, 1, 9, 2, 7, 3, 10, 4, 5}
204 S = {6}

200

202  L = {0, 1, 9, 2, 7, 3, 10, 4, 5, 6}

204  S = {8}

400

Last Resource: None

408  H0: {0, 9, 4, 7, 6}
410  H1: {9, 6}
412  H2: {9}
414  H3: not tested

402  L = {1, 3, 2, 5, 9}
404  $S_{in}$ = {0, 9, 4, 7, 6}
406  $S_{out}$ = {0, 10, 4, 7, 6}

400

Last Resource: Res. A

402  $L = \{1, 3, 2, 5, 9, 6\}$

404  $S_{in} = \{0, 10, 4, 7, 6\}$

406  $S_{out} = \{0, 10, 4, 7, 8\}$

408  H0: $\{0, 10, 6\}$
410  H1: $\{6\}$
412  H2: not tested
414  H3: not tested

400

Last Resource: Res. B

0
None

7
Res. A

4
Res. A
Res. B

10
Res. B

8
Res. A

402  L = {1, 3, 2, 5, 9, 6, 7}

404  $S_{in}$ = {0, 10, 4, 7, 8}
406  $S_{out}$ = {0, 10, 4, 8}

408  H0: {0, 7, 8}
410  H1: {0, 7, 8}
412  H2: {7, 8}
414  H3: {7}

400

Last Resource: Res. A

402  L = {1, 3, 2, 5, 9, 6, 7, 10}
404  $S_{in}$ = {0, 10, 4, 8}
406  $S_{out}$ = {0, 4, 8}

408  H0: {0, 10}
410  H1: {0, 10}
412  H2: {10}
414  H3: not tested

400

Last Resource: Res. B

402  L = {1, 3, 2, 5, 9, 6, 7, 10, 8}

404  $S_{in}$ = {0, 4, 8}
406  $S_{out}$ = {0, 4}

408  H0: {0, 8}
410  H1: {0, 8}
412  H2: {8}
414  H3: not tested

Last Resource: Res. A

402  L = {1, 3, 2, 5, 9, 6, 7, 10, 8, 0}

404  $S_{in}$ = {0, 4}
406  $S_{out}$ = {4}

408  H0: {0}
410  H1: not tested
412  H2: not tested
414  H3: not tested

Last Resource: None

400

402  L = {1, 3, 2, 5, 9, 6, 7, 10, 8, 0, 4}

404  $S_{in}$ = {4}
406  $S_{out}$ = null

408  H0: {4}
410  H1: not tested
412  H2: not tested
414  H3: not tested

SORTING TASKS WITH DEPENDENCIES AND RESOURCE SHARING

BACKGROUND

A number of problems in computing require resolving dependency issues. Optimizing the resolution of these dependencies in a way that not only accounts for the dependencies themselves, but also the resources used by various tasks (e.g., software package installation, instruction execution, and calculations) is not a simple problem—in fact, it is a constraint satisfaction problem in the class of NP problems. Optimization is therefore an expensive computational challenge.

Accordingly, approaches are needed to improve task sorting without requiring expensive optimization computations.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for sorting tasks with dependencies and resource sharing.

Performing tasks with dependency constraints is a regular problem in computing. Often, tasks to be performed will require a result from another task for its own execution, which creates the dependency. These problems come up in, for example, the installation of software packages with dependencies, execution of instructions with dependencies, or in the performance of complex calculations with dependencies on earlier results. In the case of software package installation, an administrator may wish to install software A, which requires installation of software B first. But software B may itself require installation of software C first. In such a simple scenario, the installation order would therefore be C, B, A.

These dependencies can be maintained in the form of a dependency graph. A dependency graph is a directed acyclic graph where each node represents an object (in this case, a task), and each edge represents a dependency. For example, if Node A has an edge directed to Node B (represented as A→B in this text), this means that Node B depends from Node A. This relationship may also be described as a parent/child relationship, where the dependent node is the child to the node it depends from (in this case, Node A is the parent and Node B is the child).

Starting from a dependency graph, it is possible to construct an order of execution for the tasks contained therein. This is accomplished by, for example, performing a topological sort on the dependency graph. Topological sorts are described generally in, for example, A. B. Kahn, "Topological Sorting of Large Networks," Communications of the ACM 5, 11, pp. 558-62 (January 1962).

Figure 1:
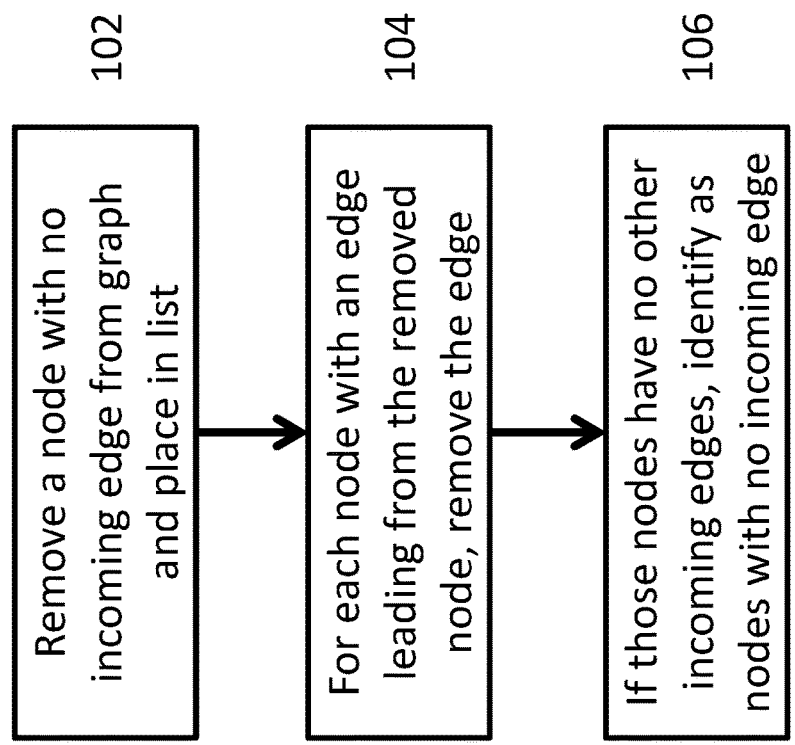
FIG. 1 is a flowchart illustrating steps for performing a topological sort on a dependency graph, in accordance with an embodiment.

FIG. 1 is a flowchart 100 illustrating steps for performing a topological sort on a dependency graph, in accordance with an embodiment. The process begins at step 102, where a node with no incoming edge is removed from the dependency graph and placed in an execution list.

Any node in the dependency graph that lacks an incoming edge is not a child node (and may be considered a parent node, even though it may not have any child nodes of its own). Because the node is not a child node, this means that it does not have any dependencies on any of the other nodes in the dependency graph.

Multiple such nodes may be present in the dependency graph, and those nodes would also be identified and removed from the dependency graph, and placed in the execution list at step 102. Notably, this approach does not make a judgment regarding which node should be placed in the execution list first if multiple such nodes are available at step 102.

With the parent nodes removed from the graph and placed in the execution list, the directed edges leading from those parent nodes are likewise removed at step 104. At step 106, any nodes that have had incoming directed edges removed are checked to see whether they now have no incoming edges.

The process of flowchart 100 repeats, with any newly-identified nodes at step 106 that have no incoming edges treated as the parent nodes for the purposes of step 102, and continuing on to steps 104 and 106, until no nodes remain in the dependency graph and all nodes have been added to the execution list.

The following pseudocode provides an exemplary and non-limiting implementation of this topological sort:

```
L ← Empty list that will contain the sorted nodes
S ← Set of all nodes with no incoming edge
while S is non-empty do
    remove a node n from S
    add n to tail of L
    for each node m with an edge e from n to m do
        remove edge e from the graph
        if m has no other incoming edges then
            insert m into S
if graph has edges then
    return error (graph has at least one cycle)
else
    return L (a topologically sorted order)
```

FIGS. 2A-2E illustrate stages of application of a topological sort on a dependency graph, in accordance with an embodiment. FIGS. 2A-2E use consistent labels as the above pseudocode, where "L" 202 is the list that ultimately contains the sorted nodes (also known as the "execution list") and "S" 204 is the set of all nodes with no incoming edge. Nodes that are connected to other nodes are connected by a directed edge from a parent node to a child node, indicating that the child node has a dependency on the parent node.

Notably, the nodes in FIGS. 2A-2E also include a resource they need. This could be a memory resource, a library, or some other resource that could create a conflict during execution, by way of non-limiting example. One skilled in the art will recognize that, when there are resource conflicts, these conflicts will need to be resolved in turn—a latter call to the resource will typically stall until the resource becomes available. But although the nodes of FIGS. 2A-2E show their resource requirements, the above topological sort algorithm does not account for these requirements at all. The result is a sort order that may lead to conflicts.

Figure 2A:
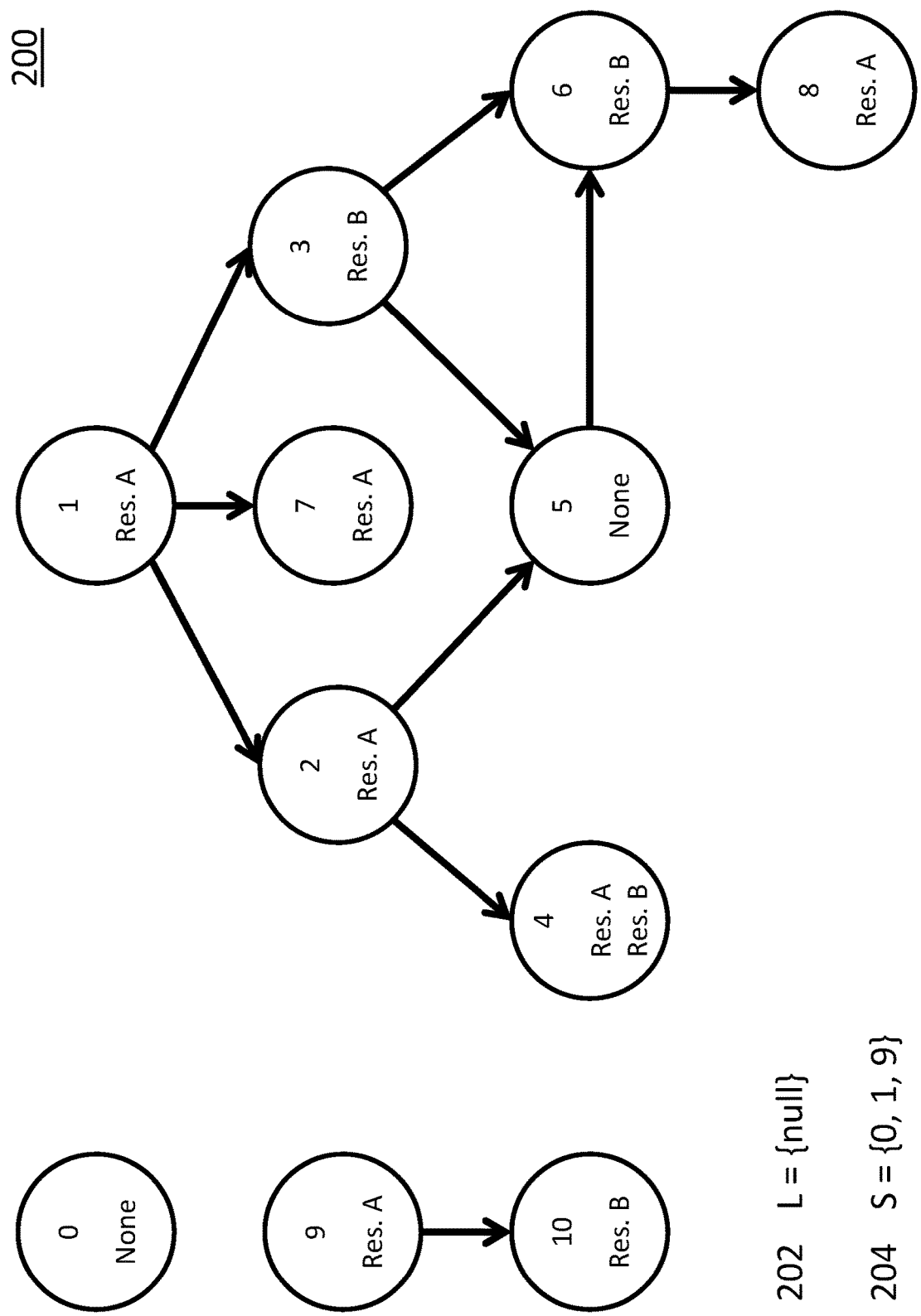
FIGS. 2A-2E illustrate stages of application of a topological sort on a dependency graph, in accordance with an embodiment.

The sort begins at FIG. 2A with dependency graph 200. At this point, L 202 is empty (or "null"), as no nodes have been added to the execution list. S 204 is configured with the parent nodes, in this case nodes 0, 1, and 9. In accordance with flowchart 100 of FIG. 1, nodes 0, 1, and 9 are removed from the graph and placed into the execution list L 202 at step 102, and their edges removed from the graph at step 104. And at step 106, the child nodes are added to S 204 set of all nodes with no incoming edge.

Figure 2B:
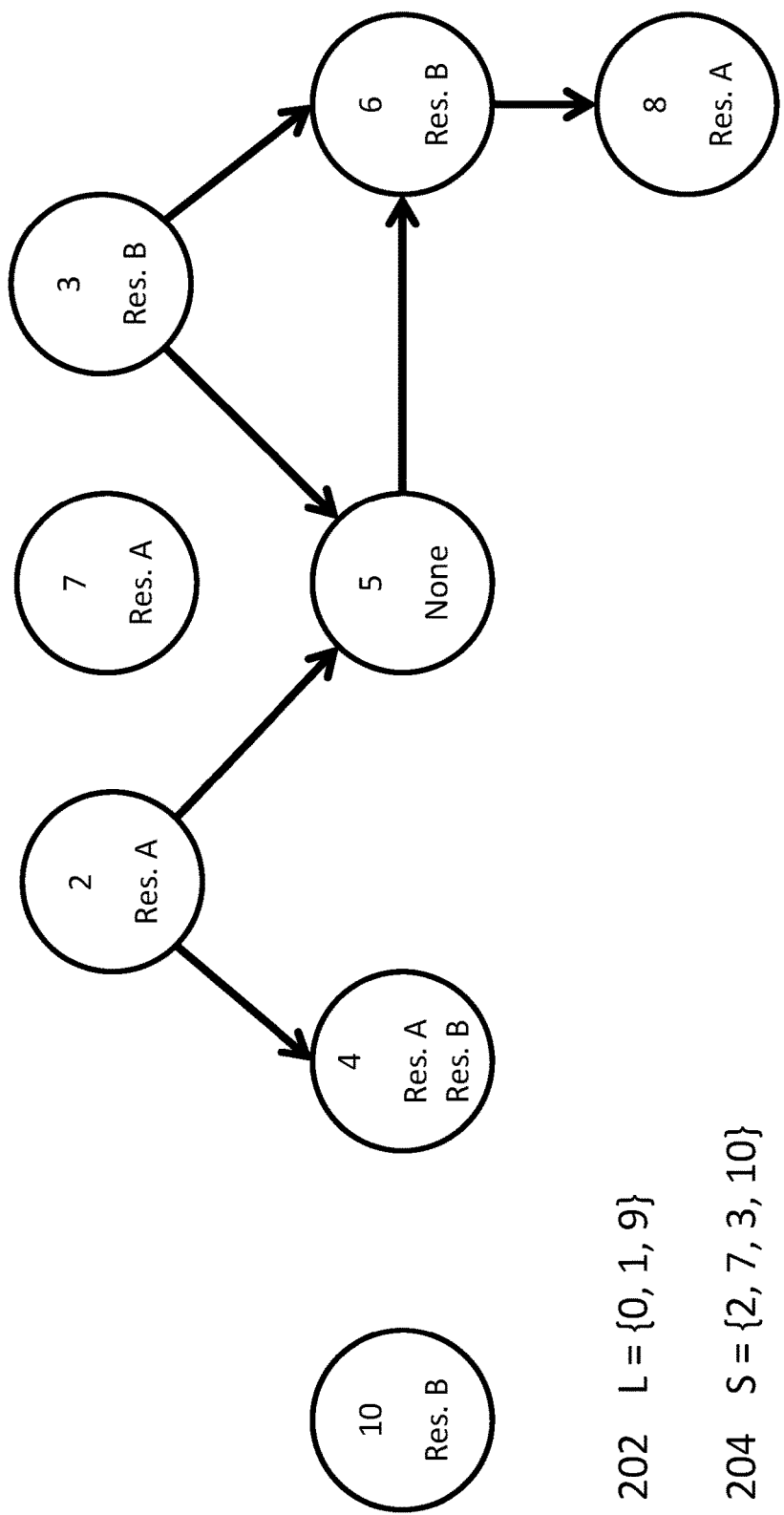
Figure 2C:
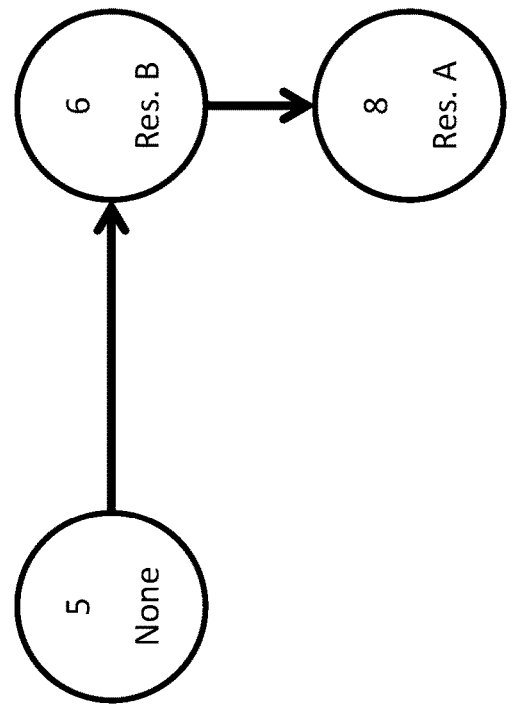
Figure 2C:
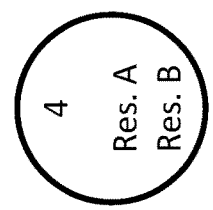
Figure 2D:
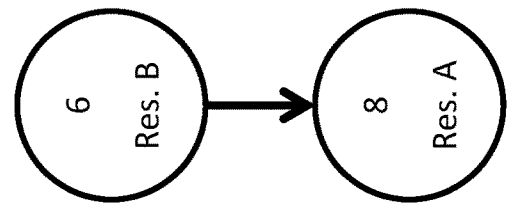
Figure 2E:
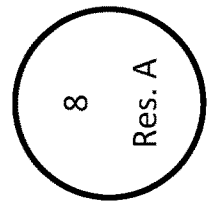

The result is FIG. 2B, with nodes 0, 1, and 9 added to L 202 for execution, and the new set of nodes with no incoming edge (parent nodes), namely nodes 2, 7, 3, and 10, added to S 204. The process repeats, with FIG. 2C showing nodes 2, 7, 3, and 10 and their edges removed from the graph and added to L 202 for execution, with nodes 4 and 5 being the new parent nodes in S 204. At FIG. 2D, nodes 4 and 5 and their edges have been removed from the graph and added to L 202 for execution, with node 6 being the sole new parent node in S 204. And at FIG. 2E, node 6 is removed from the graph and added to L 202 for execution, with node 8 being the sole new parent node in S 204. Ultimately, node 8 is then added to L 202 for execution, so that the final execution order L 202 is {0, 1, 9, 2, 7, 3, 10, 4, 5, 6, 8}.

Looking at this sort order in view of the original dependency graph 200 in FIG. 2A, it is clear that there are no conflicts with dependencies. For example, node 5 depends on both nodes 2 and 3, which both depend on node 1. And, in fact, the dependency order resolves node 1 before nodes 2 and 3, and resolves both nodes 2 and 3 before resolving node 5.

One skilled in the relevant arts will appreciate that, at each iteration of the flowchart 100 of FIG. 1, the next node from S 204 to be added to L 202 for execution is selected irrespective of resource constraints, but that many other selection processes may nevertheless be used. In this particular embodiment, the entirety of S 204 is added, in the same order, to the tail of L 202, but one skilled in the relevant arts will appreciate that S 204 may be recomputed after the addition of individual nodes to L 202, or using other approaches not discussed herein.

Regardless, the sort order may result in resource contention, as resource constraints are not accounted for. FIGS. 2A-2E show a specific resource needed by each node. In this non-limiting example embodiment, the resources may be Resource A, Resource B, both Resource A+B, or no resource ("none"). By way of example, and not limitation, a task represented by a node is executed and then torn down. Once a task completes, and during its teardown, the next task may execute. However, the teardown process includes the process of releasing resources used by the task—which may include resources A and/or B, if needed by the task. These resources remain unavailable during the teardown process.

Assume, by way of non-limiting example, that execution of a task requires one cycle, and teardown of that task requires one cycle. A first task executes, which requires Resource A. The first task executes during a first cycle. During the second cycle, it undergoes teardown, but Resource A remains unavailable until the third cycle. A second task may execute during the second cycle, but only if it does not require Resource A for its execution. If a conflict occurs, such that the second task does require Resource A for its execution, the second task will need to stall until the third cycle, when Resource A becomes available again, in order to execute. This would result in the second cycle being wasted.

As a result, it is preferable that the second task be selected as a task that does not require Resource A for its execution, in order to avoid this wasted cycle. Nevertheless, the second task must still meet all dependency constraints—it is not possible to select a second task with an unresolved dependency, regardless of its preferable resource needs.

In view of the resource constraints shown in FIG. 2A, the execution order given by the topological sort of {0, 1, 9, 2, 7, 3, 10, 4, 5, 6, 8} causes some resource contention. Specifically, given the execution cost of 1 cycle for a task, and 1 cycle for teardown (during which another task may execute if there is no resource contention), the following table shows the result of this execution order:

| Cycle | Task | Resource |
| --- | --- | --- |
| 0 | 0 | None |
| 1 | 1 | Res. A |
| 2 | None | |
| 3 | 9 | Res. A |
| 4 | None | |
| 5 | 2 | Res. A |
| 6 | None | |
| 7 | 7 | Res. A |
| 8 | 3 | Res. B |
| 9 | None | |
| 10 | 10 | Res. B |
| 11 | None | |
| 12 | 4 | Res. A + B |
| 13 | 5 | None |
| 14 | 6 | Res. B |
| 15 | 8 | Res. A |

As shown in this execution table, five execution cycles are wasted from resource conflicts. For example, tasks 1, 9, 2, and 7 all require the use of Resource A, which means tasks 9, 2, and 7 must stall during the teardown cycle of the previous task. Similarly, tasks 3, 10, and 4 all require the use of Resource B, which means tasks 10 and 4 must stall during the teardown cycle of the previous task.

The above execution order is valid, in that it does not result in any dependency issues. However, it would be preferable to optimize resource usage as well in order to avoid useless execution cycles where a task is blocked waiting for a necessary resource.

Optimization of the task order to remove resource contention is an NP-complete problem. In mathematics, this type of problem is typically termed a constraint satisfaction problem. An optimal solution to the problem may be found, but the computational time needed in order to find the optimal solution and verify that it is the optimal solution may be significant (especially as the size of the graph grows). The cost of solving this NP-complete problem to determine the optimal solution may therefore overshadow the computational efficiency obtained by the optimal solution itself.

Figure 3:
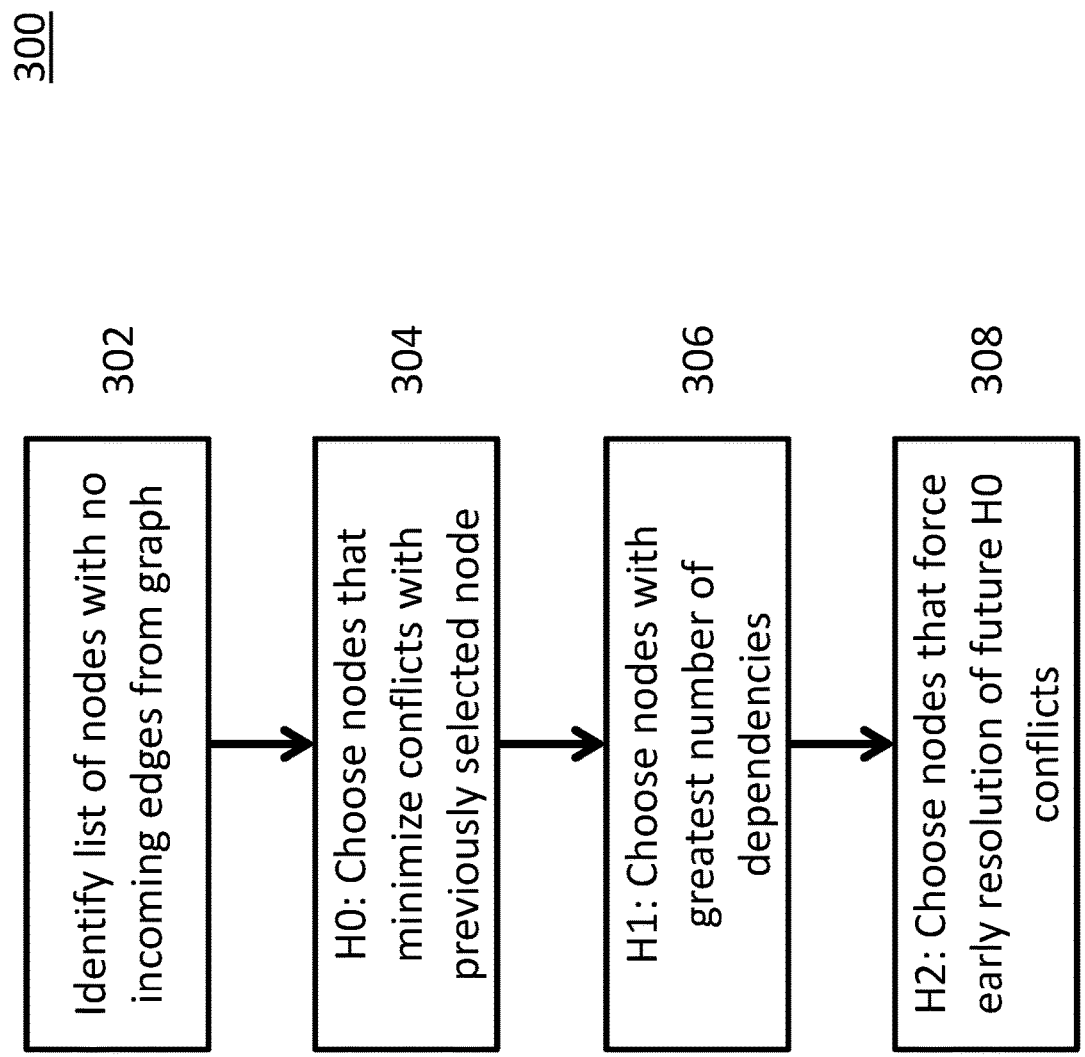
FIG. 3 is a flowchart illustrating steps in a heuristic for determining a next node from a dependency graph, in accordance with an embodiment.

Instead, in accordance with an embodiment, a set of heuristics is applied. FIG. 3 is a flowchart 300 illustrating steps in a heuristic for determining a next node from a dependency graph, in accordance with an embodiment. This heuristic approach of flowchart 300 is designed to minimize resource contention, thereby reducing the number of wasted execution cycles. However, it may not result in the optimal order in every scenario, given the NP-complete difficulty in finding an optimal order.

The heuristic approach of flowchart 300 is a compromise that results in near-optimal execution order, accounting for resource conflicts, while the heuristic itself executes in significantly less computing time than an NP-complete optimizer. In the day-to-day use of the framework, where there are only a few tasks that have dependencies and few others that use resources, the execution time of flowchart 300 is imperceptible. The framework given by flowchart 300 is now able to receive a large number of tasks that require resources and/or dependencies and execute them in a smart order, avoiding wasted execution cycles.

The process begins at step 302 where a list of nodes with no incoming edges is identified. This identification of nodes with no incoming edges is the same as with the earlier approach of flowchart 100 of FIG. 1. However, rather than simply committing those nodes to the execution list (e.g., committing the nodes from S 204 to L 202 of FIG. 2), several heuristics may be applied in order to decide which of those parent nodes should be committed to execution list next.

One skilled in the relevant art will recognize that these heuristics may be applied individually, or as a group, and may also be applied in other orders. However, the particular order of the heuristics given in flowchart 300 provides an improved execution order strategy in the majority of scenarios.

At step 304, heuristic H0 is applied. Heuristic H0 is configured to minimize resources conflicts, and emphasizes selecting nodes that do not conflict with a resource used by an immediately prior node (or by any prior node that would still have a lock on resources during the execution of the current node, such as in the case of longer teardown periods). This heuristic is, in accordance with an embodiment, applied first in order to avoid any stalling due to needing a resource locked by a prior node.

At step 306, heuristic H1 is applied to maximize dependents, and emphasizes selecting nodes with the most child nodes dependent upon it. In accordance with an embodiment, heuristic H1 is applied on the result of heuristic H0 if multiple nodes give an equal result to H0.

At step 308, heuristic H2 is applied to choose nodes that force early resolution of future heuristic H0 conflicts. In accordance with an embodiment, heuristic H2 is resolved by selecting nodes having a resource need equal to the most frequent resource need of the remaining nodes. Additionally, in accordance with an embodiment, heuristic H2 is applied on the result of heuristic H1 if multiple nodes give an equal result to heuristic H1.

If the application of any heuristic H0, H1, or H2 results in a single node at the stage in which the heuristic is applied, there is no need to continue processing further heuristics, and the single node is added to the execution list at the tail end of the list.

Additionally, if no single node results from the application of the heuristics, an additional heuristic, heuristic H3, may be applied in order to determine a single node to be added to the execution list. By way of non-limiting example, heuristic H3 may be a tie-breaker heuristic that selects the single node among the remaining nodes based on a test that can only result in a single node. In accordance with an embodiment, the test chooses the single node to be a node with a lowest key value, earliest alphabetical order (for nodes having a name), or other indicator of being the earliest node inserted into a dependency graph of the remaining nodes. In accordance with a further embodiment, heuristic H3 is applied on the result of heuristic H2 if multiple nodes give an equal result to heuristic H2.

The heuristic shown in flowchart 300 of FIG. 3 is discussed in detail using an example dependency graph. FIGS. 4A-4L illustrate stages of application of a heuristic (consistent with the heuristic of flowchart 300 of FIG. 3) for determining a next node, in accordance with an embodiment. Nodes that are connected to other nodes are connected by a directed edge from a parent node to a child node, indicating that the child node has a dependency on the parent node.

Figure 4A:
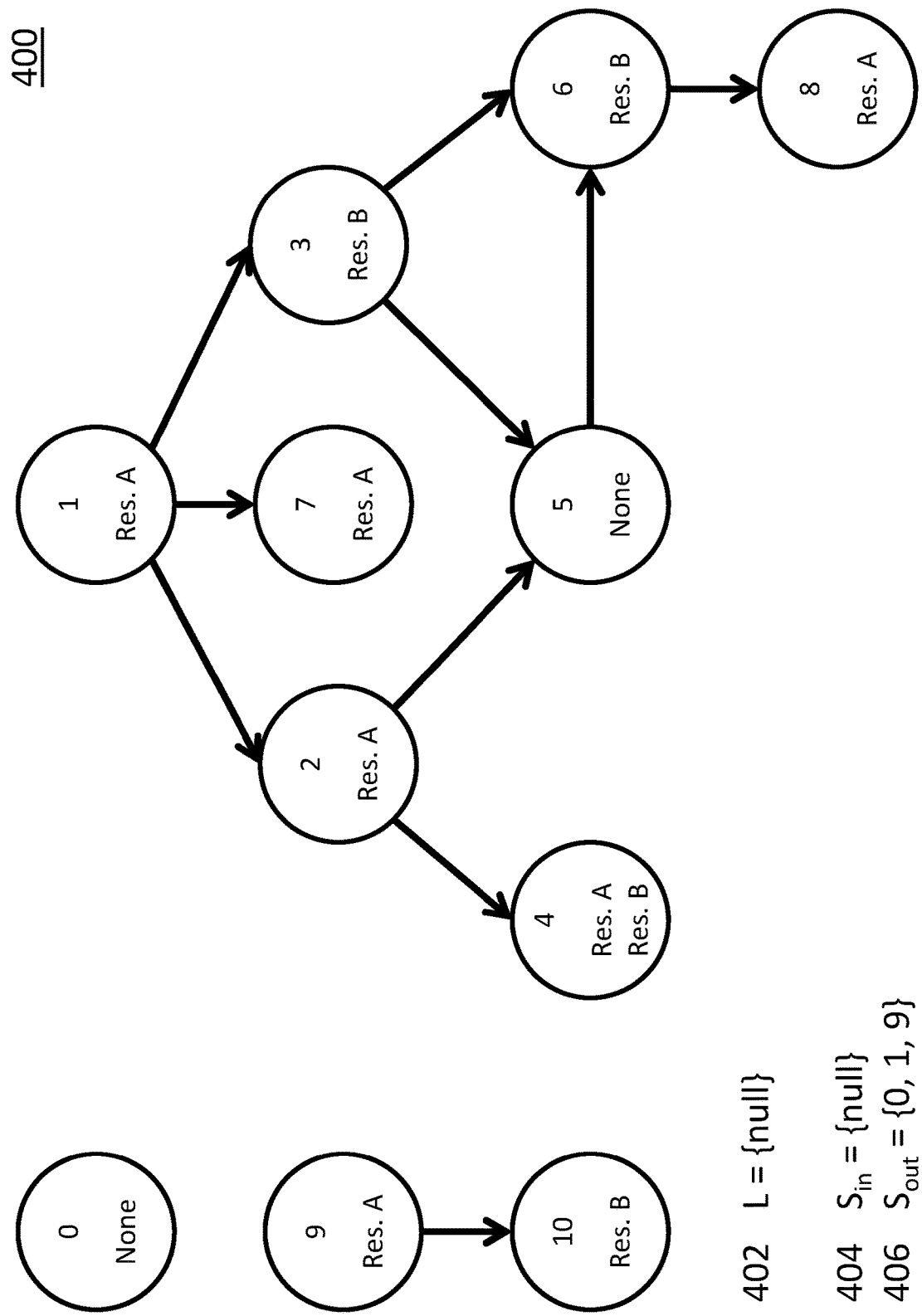
FIGS. 4A-4L illustrate stages of application of a heuristic for determining a next node, in accordance with an embodiment.

FIG. 4A illustrates a dependency graph 400, in accordance with an embodiment. Dependency graph 400 begins in an identical state, and with identical resource requirements for each node 0 through 10, as dependency graph 200 of FIG. 2A.

As with FIG. 2A elements 202 and 204, FIG. 4A includes "L" 402 (corresponding to L 202), which is the list that ultimately contains the sorted nodes (also known as the "execution list"). FIG. 4A also includes "$S_{in}$" 404 (corresponding to S 204), which is the set of all nodes with no incoming edge (i.e., parent nodes). After each iteration of flowchart 300 of FIG. 3, a node is removed from $S_{in}$ 404 (and from the graph 400) and placed at the tail end of L 402, as the next node to be executed.

However, at initial execution, the parent nodes need to be identified. After each step, the parent nodes used for the next step are determined, and held at $S_{out}$ 406. Or, as in FIG. 4A, the parent nodes of the initial dependency graph 400 are determined and placed in $S_{out}$ 406 (in this case, nodes 0, 1, and 9 are the parent nodes).

Figure 4B:
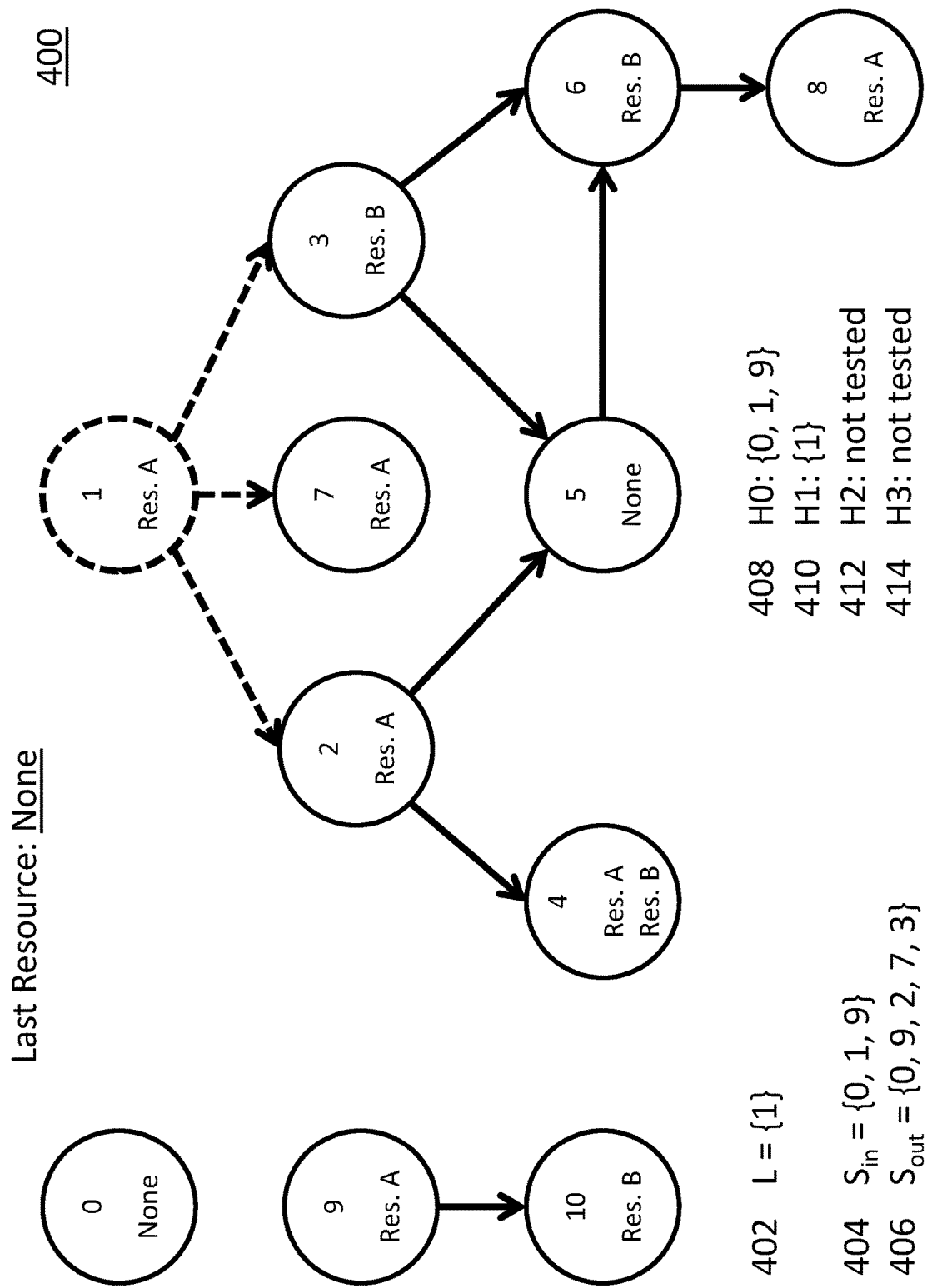

FIG. 4B shows the first iteration of flowchart 300 of FIG. 3 on graph 400. The parent nodes ($S_{in}$ 404={0, 1, 9}), are tested against each of the heuristics H0 through H3, as needed. The results of each heuristic are shown in FIGS. 4B-4L as H0 408, H1 410, H2 412, and H3 414. If a heuristic is marked as "not tested," that is because a next node to be included in L 402 was determined by a prior heuristic, and the latter heuristic was not needed.

In FIG. 4B, heuristic H0 is run against the set of nodes 0, 1, and 9. The result of H0 is a tie among all three nodes—since no resource was used by execution of a prior node (see "Last Resource: None" in FIG. 4B), any of the resources needed by nodes 0, 1, and 9 (None, Res. A, and Res. A, respectively) is available. So H0 results in the same set of nodes 0, 1, and 9 at 408.

At 410, heuristic H1 is run against the set of nodes 0, 1, and 9 from 408. Heuristic H1 chooses the node with the greatest number of dependencies. In this case, that node is 1: node 0 has no children, node 9 has one child, and node 1 has three children dependent from it.

Since heuristic H1 at 410 produces a single node, heuristics H2 412 and H3 414 are not tested. Node 1 is removed from dependency graph 400 and added to the tail of L 402 (in this case, it is the first node of the list).

In accordance with an embodiment, a new set of parent nodes $S_{out}$ 406 is computed. This may be accomplished by, for example, performing the same task as steps 102, 104, and 106 of FIG. 1 of the topological sort, in accordance with a further embodiment, after the removal of each node from dependency graph 400. Nodes 0 and 9 carry over from $S_{in}$ 404 to $S_{out}$ 406. As node 1 is removed from graph 400 (per, e.g., step 102 of FIG. 1), and its edges are removed from graph 400 as well (per, e.g., step 104 of FIG. 1), all shown as dashed lines, each of the children of node 1 are tested to determine whether they have any incoming edges (per, e.g., step 106 of FIG. 1). If they do not, which in this case neither nodes 2, 7, nor 3 have any other incoming edges, then they are added to the parent node list, $S_{out}$ 406. The process then repeats until the graph 400 is empty and all nodes have been added to L 402.

Figure 4C:
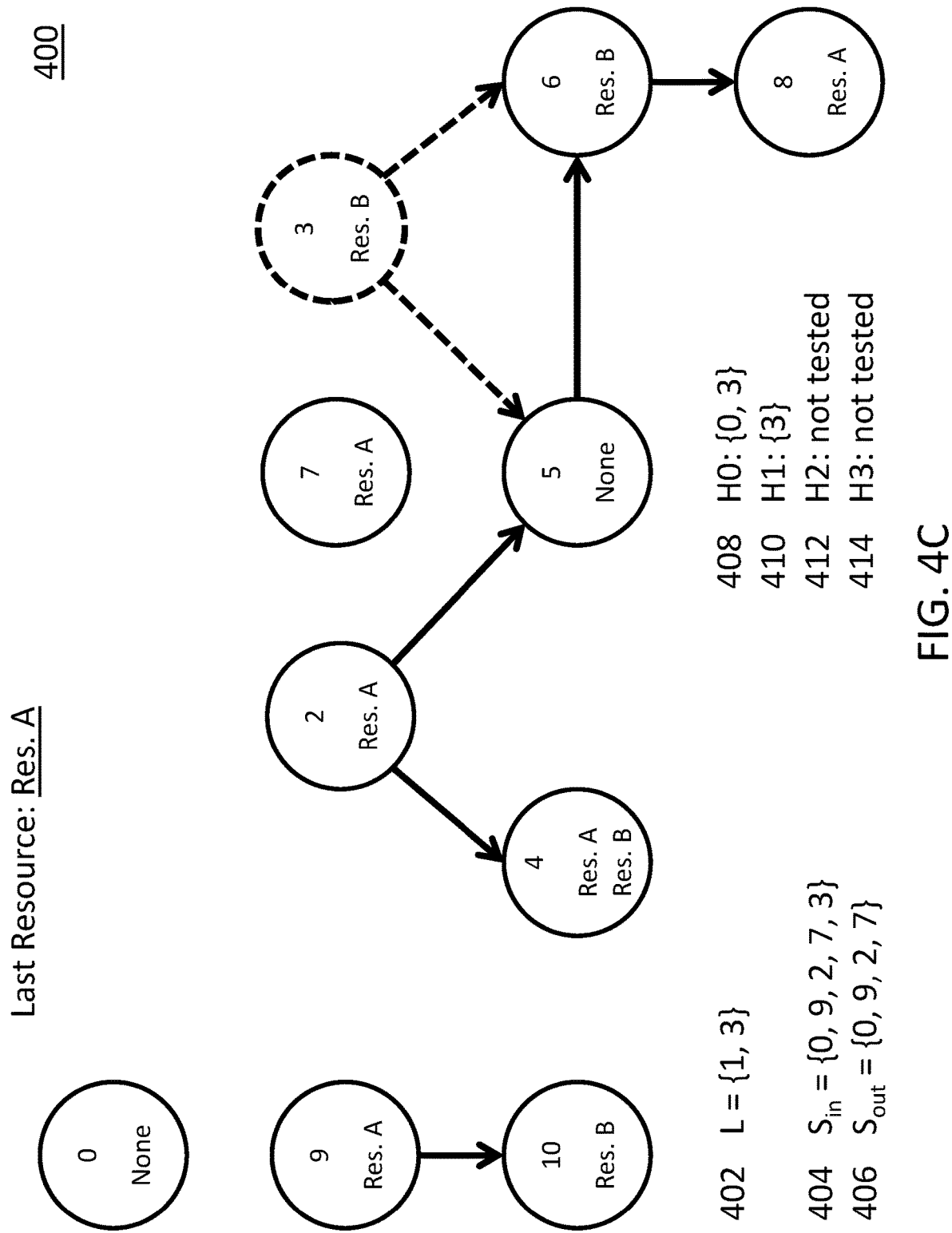

To continue the example, FIG. 4C shows the next iteration of flowchart 300 of FIG. 3 applied to graph 400, in accordance with an embodiment. $S_{in}$ 404 indicates that nodes 0, 9, 2, 7, and 3 are parent nodes, which are tested against H0 408. Since the last resource used (by execution of node 1) was Resource A, preference is given to any nodes that do not require Resource A. Nodes 9, 2, and 7 all require Resource A, so nodes 0 and 3 are produced as the result of H0 408.

At 410, heuristic H1 is run against the set of nodes 0 and 3 from 408. Heuristic H1 chooses the node with the greatest number of dependencies, which in this case is node 3: node 0 has no children, and node 3 has two children. Since heuristic H1 at 410 produces a single node, heuristics H2 412 and H3 414 are not tested. Node 3 is removed from dependency graph 400 and added to the tail of L 402.

Once again, the remaining nodes in $S_{in}$ 404 (nodes 0, 9, 2, and 7) are copied to $S_{out}$ 406. Applying the steps of flowchart 100 of FIG. 1 to the children of node 3 (nodes 5 and 6), we see at step 106 this time that both nodes 5 and 6 have additional incoming edges, so they are not identified as parent nodes and are not added to $S_{out}$ 406.

Figure 4D:
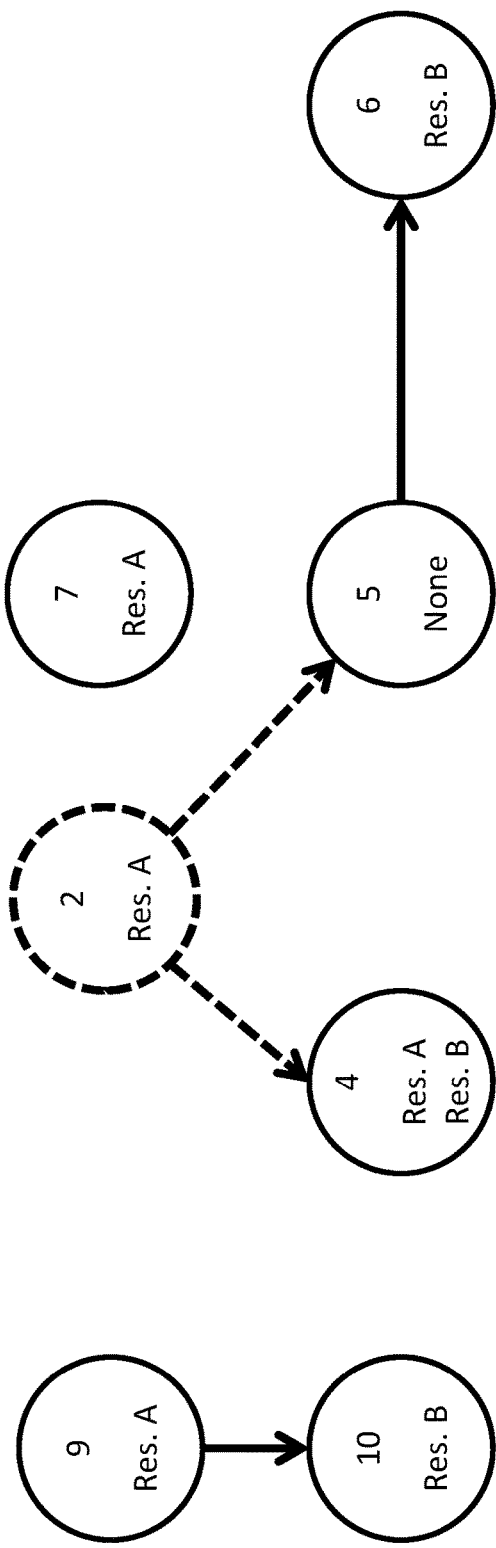

The process continues to FIG. 4D with the next iteration, in accordance with an embodiment. This time, $S_{in}$ 404={0, 9, 2, 7} are tested against heuristic H0—and all of the nodes have equal weight. This is because nodes 0, 9, 2, and 7 do not require Resource B (the last resource needed by node 3). When heuristic H1 is applied to the results of heuristic H0 (nodes 0, 9, 2, and 7), the result is again a single node 2, selected because it has the greatest number of dependencies. Node 2 is added to L 402. And nodes 4 and 5 are added to $S_{out}$ 406 because they are now parent nodes upon the removal of node 2 from dependency graph 400.

Figure 4E:
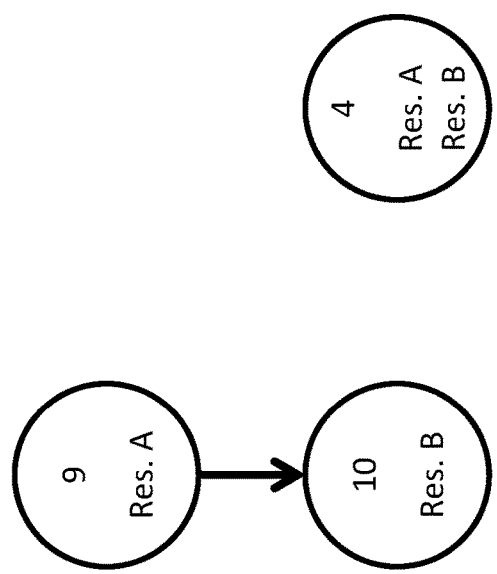
Figure 4E:
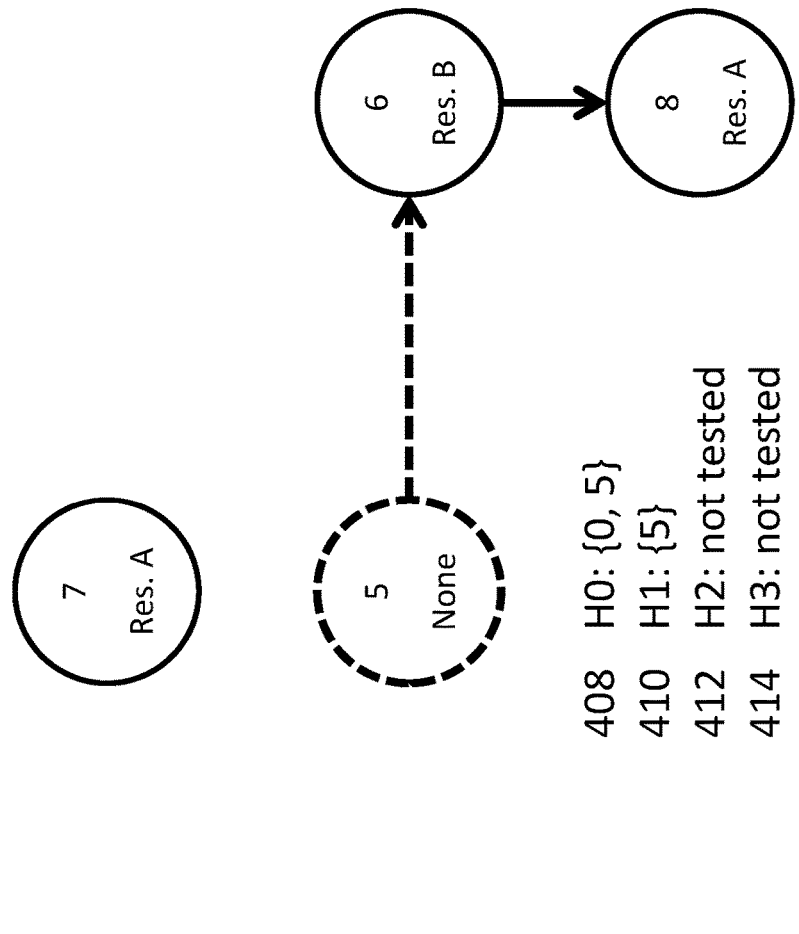
Figure 4F:
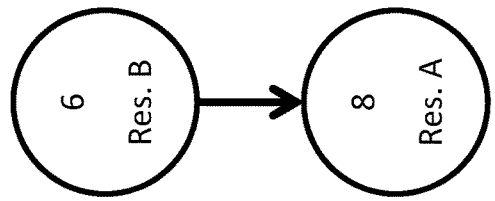
Figure 4F:
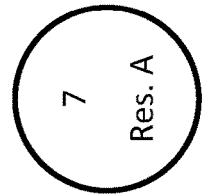
Figure 4F:
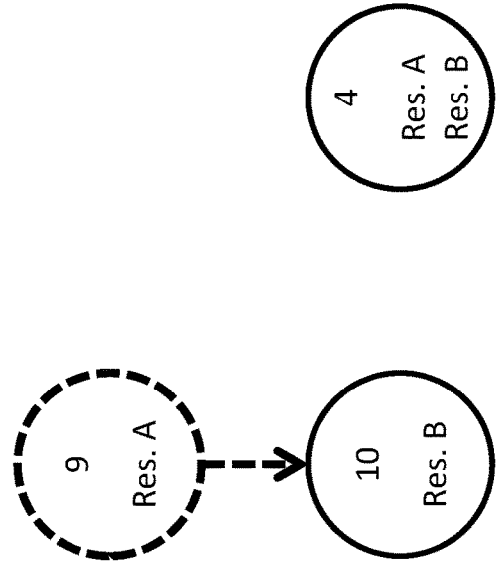
Figure 4F:
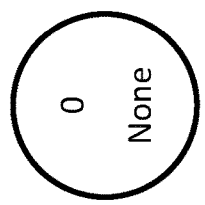
Figure 4F:
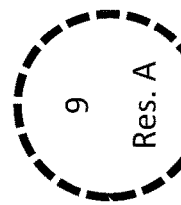
Figure 4G:
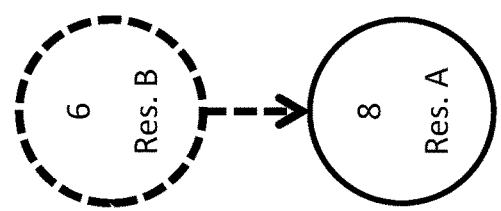
Figure 4G:
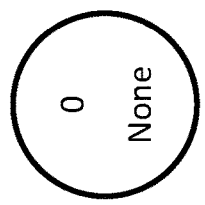
Figure 4G:
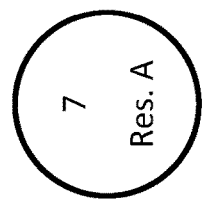
Figure 4G:
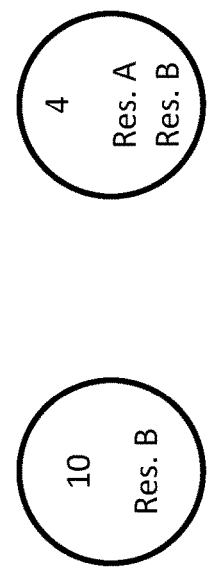
Figure 4H:
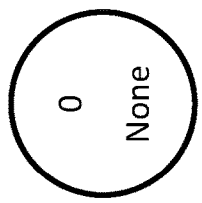
Figure 4H:
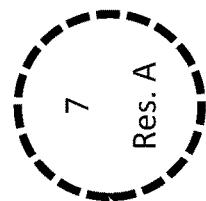
Figure 4H:
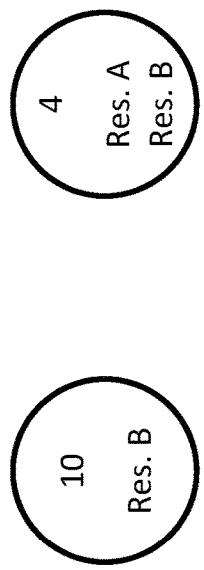
Figure 4I:
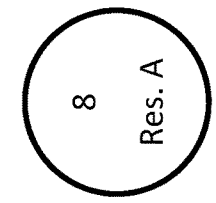
Figure 4I:
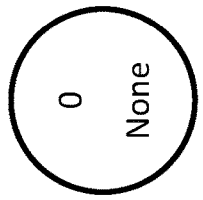
Figure 4I:
Figure 4J:
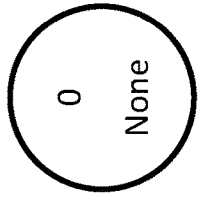
Figure 4J:
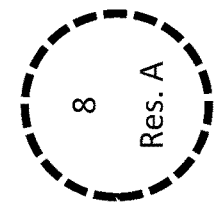
Figure 4J:
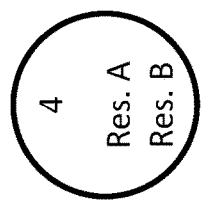
Figure 4K:
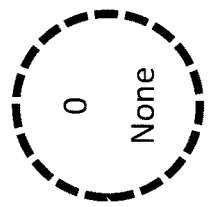
Figure 4K:
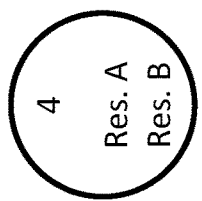

The process continues to FIG. 4E with the next iteration, in accordance with an embodiment. This time, $S_{in}$ 404={0, 9, 4, 7, 5} are tested against heuristic H0, which results in a tie between nodes 0 and 5 at 408. This is because the last resource (used by node 2) was Resource A, which is needed by nodes 9, 4, and 7, but not by nodes 0 and 5 (both of which require no resources). And as node 5 has one dependency to node 0's lack of dependencies, it is selected by H1 410 for placement into L 402. Removal of node 5 from dependency graph 400 results in node 6 becoming a parent node and added to $S_{out}$ 406.

The process again continues to FIG. 4F with the next iteration, in accordance with an embodiment. Parent nodes $S_{in}$ 404={0, 9, 4, 7, 6} are run through heuristic H0 408, which produces a five-way tie—as no resource was used by the execution of node 5 (see "Last Resource: None" at the top of FIG. 4F), no resource conflict can exist regardless of a node's resource needs. Running nodes 0, 9, 4, 7, 6 resulting from heuristic H0 408 through heuristic H1 410 results in a tie between nodes 9 and 6—both nodes each have a single child dependent on them, whereas the other nodes have no children.

At this point, heuristic H2 412 is used to resolve the tie between nodes 9 and 6. Heuristic H2 412 chooses node 9 for inclusion in L 402, in accordance with an embodiment, because node 9 requires Resource A (which is needed by four of the remaining nodes of dependency graph 400), whereas node 6 requires Resource B (which is only needed by three of the remaining nodes of dependency graph 400). Selecting the node with the most conflicting dependencies (as tested by heuristic H0 408) reduces the possible number of conflicts. Notably, if the heuristic were reversed and node 6 selected instead of node 9, a later conflict with nodes 4 and 8 would result in wasted execution cycles—the final order would be L 402={1, 3, 2, 5, 6, 9, 10, 7, 0, 4, 8}.

The process again continues to FIG. 4G with the next iteration, in accordance with an embodiment. Parent nodes $S_{in}$ 404={0, 10, 4, 7, 6} are run through heuristic H0 408, which produces a three-way tie with nodes 0, 10, and 6—the last resource, Resource A used by node 9, is needed by nodes 4 and 7, but not by nodes 0, 10, and 6. And, since node 6 has a dependency where the other nodes do not, node 6 is selected as the next node and added to the tail of L 402.

The process again continues to FIG. 4H with the next iteration, in accordance with an embodiment. Parent nodes $S_{in}$ 404={0, 10, 4, 7, 8} are run through heuristic H0 408, which produces a three-way tie with nodes 0, 7, and 8—the last resource, Resource B used by node 6, is needed by nodes 10 and 4, but not by nodes 0, 7, and 8. Since no dependencies remain, heuristic H1 410 also results in a three-way tie.

Running heuristic H2 412 on nodes 0, 7, and 8 results in a tie between nodes 7 and 8—node 0 has no resource use, and so will not accelerate H0 conflicts. Both nodes 7 and 8 require Resource A, so both would serve to accelerate H0 conflicts equally.

In this case, selecting between nodes 7 and 8 is a toss-up—and at heuristic H3 414, node 7 is selected. In accordance with an embodiment, either node may be selected randomly by heuristic H3 414. In accordance with a further embodiment, as in the case shown in FIG. 4H, a node with a lower index value indicative of an earlier position in dependency graph 400 is selected.

The process again continues to FIG. 4I with the next iteration, in accordance with an embodiment. Parent nodes $S_{in}$ 404={0, 10, 4, 8} are run through heuristic H0 408, which produces a tie between nodes 0 and 10—the last resource, Resource A used by node 7, is needed by nodes 4 and 8, but not by nodes 0 and 10. And again, since no dependencies remain, heuristic H1 410 results in the same tie between nodes 0 and 10. Heuristic H2 412 resolves this tie in favor of node 10 because node 0, having no resource needs, cannot accelerate H0 conflicts, whereas node 10 has a resource conflict with node 4. Node 10 is then added to L 402.

The process again continues to FIG. 4J with the next iteration, in accordance with an embodiment. Parent nodes $S_{in}$ 404={0, 4, 8} are run through heuristic H0 408, which produces a tie between nodes 0 and 8—the last resource, Resource B used by node 10, is needed by node 4 but not by nodes 0 and 8. And again, since no dependencies remain, heuristic H1 410 results in the same tie between nodes 0 and 8. Heuristic H2 412 resolves this tie in favor of node 8 because node 0, having no resource needs, cannot accelerate H0 conflicts, whereas node 8 has a resource conflict with node 4. Node 8 is then added to L 402.

The process again continues to FIG. 4K with the next iteration, in accordance with an embodiment. Parent nodes $S_{in}$ 404={0, 4} are run through heuristic H0 408, which selects node 0—the last resource, Resource A used by node 8, is needed by node 4. However, node 0 has no resource need and therefore no conflict. So node 0 is added to L 402.

Figure 4L:
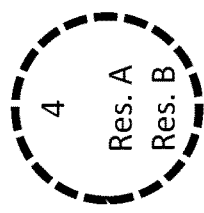

Finally, at FIG. 4L, only one node remains. Node 4 is tested at heuristic H0 408 and selected, since it is the only node provided as input. As a result, it is added to L 402.

The resulting execution order L 402 is therefore {1, 3, 2, 5, 9, 6, 7, 10, 8, 0, 4}. This execution order can be compared to the 16 cycles needed by the earlier order:

| Cycle | Task | Resource |
|-------|------|----------|
| 0 | 1 | None |
| 1 | 3 | Res. A |
| 2 | 2 | Res. B |
| 3 | 5 | Res. A |
| 4 | 9 | None |
| 5 | 6 | Res. A |
| 6 | 7 | Res. B |
| 7 | 10 | Res. A |
| 8 | 8 | Res. B |
| 9 | 0 | Res. A |
| 10 | 4 | None |

In this approach, only 11 cycles are needed—there are no wasted cycles. The result is that resource contention is eliminated in this example, and eliminated or dramatically reduced for others.

One skilled in the relevant art will appreciate that this approach can be extended to other cycles. For example, if execution of a task locks a resource for two or three cycles, heuristic H0 may be modified to account for conflicts arising from that lock. While the examples discussed herein show only two possible resources, Resource A and Resource B, there may be a larger number of resources available and needed by tasks, such that a multi-cycle lock could be resolved. The heuristic is therefore extendible to any such situation.

Figure 5:
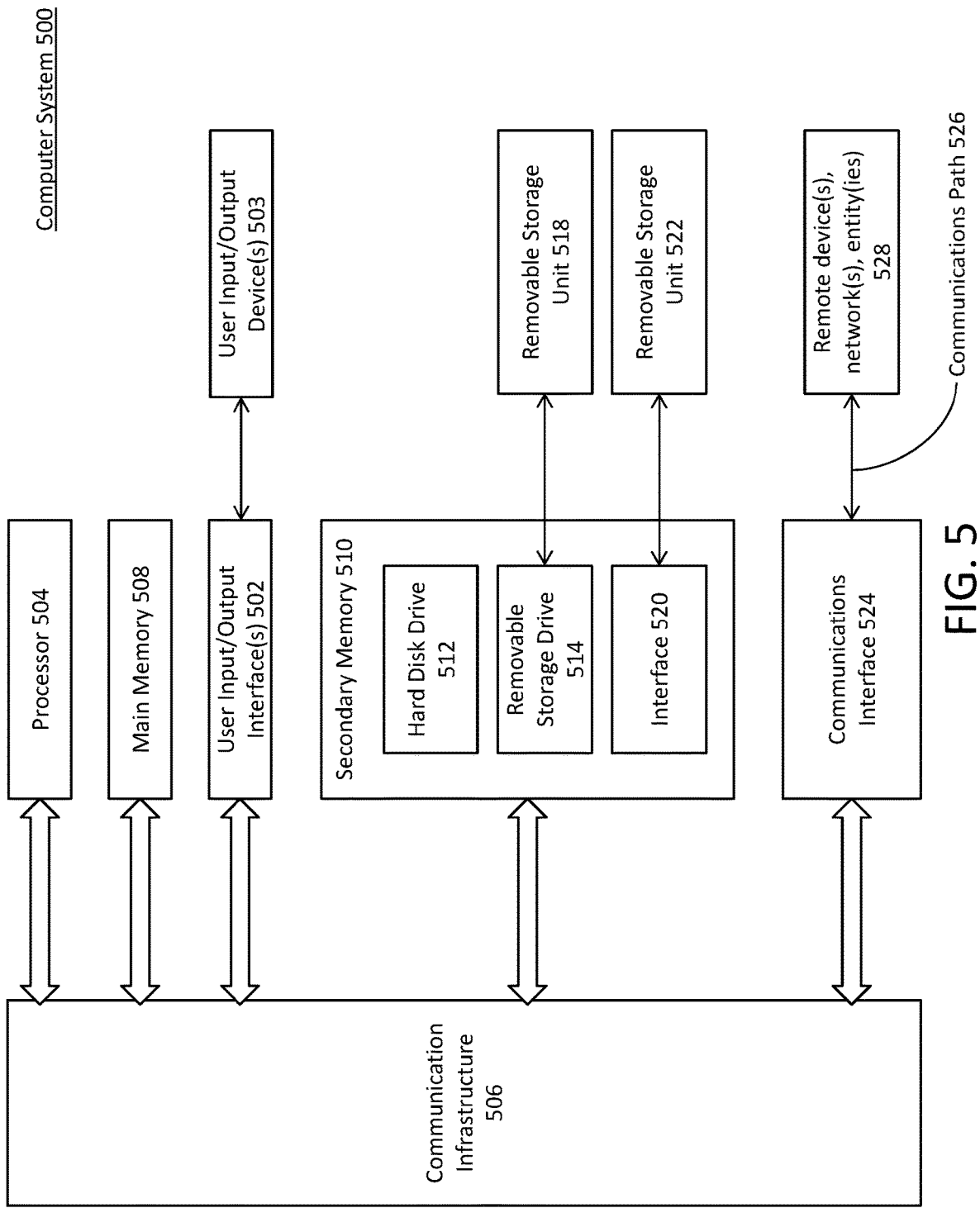
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for resolving an execution order for a plurality of tasks, comprising:
   selecting, by one or more computing devices, a list of nodes having no incoming directed edges from a graph comprising a plurality of nodes and one or more directed edges connecting out from parent nodes of the plurality of nodes into respective child nodes of the plurality of nodes, wherein the directed edges specify a dependency by the child nodes on the respective parent nodes, and wherein each node represents a task of the plurality of tasks;
   determining, by the one or more computing devices, a next node from the list of nodes that has a minimum resource utilization conflict among the nodes in the list of nodes with a resource lock held by a previous node, wherein a resource utilization conflict with the resource lock held by the previous node exists if a resource used by the previous node is locked by the resource lock when the resource is needed during execution of the next node; and
   inserting, by the one or more computing devices, the task of the plurality of tasks represented by the next node into the execution order.

2. The method of claim 1, further comprising:
   removing, by the one or more computing devices, the next node and any corresponding directed edges from the graph;
   repeating, by the one or more computing devices, the selecting, determining, removing, and inserting until there are no nodes in the graph; and
   executing, by the one or more computing devices, the plurality of tasks according to the execution order.

3. The method of claim 1, wherein a first plurality of nodes from the list of nodes have equally minimum resource utilization conflicts with the resource lock held by the previous node, the determining further comprising:
   determining, by the one or more computing devices, the next node from the first plurality of nodes having a greatest number of child nodes.

4. The method of claim 3, wherein a second plurality of nodes from the first plurality of nodes have an equal greatest number of child nodes, the determining further comprising:
   determining, by the one or more computing devices, the next node from the second plurality of nodes that forces early resolution of a future resource utilization conflict.

5. The method of claim 4, wherein a third plurality of nodes from the second plurality of nodes equally force the early resolution of the future resource utilization conflict, the determining further comprising:
   determining, by the one or more computing devices, the next node from the third plurality of nodes that was placed into the graph first.

6. The method of claim 1, wherein each of the plurality of tasks correspond to a software installation.

7. A system for resolving an execution order for a plurality of tasks, comprising:
   a memory configured to store operations; and
   one or more processors configured to perform the operations, the operations comprising:
      selecting a list of nodes having no incoming directed edges from a graph comprising a plurality of nodes and one or more directed edges connecting out from parent nodes of the plurality of nodes into respective child nodes of the plurality of nodes, wherein the directed edges specify a dependency by the child nodes on the respective parent nodes, and wherein each node represents a task of the plurality of tasks, determining a next node from the list of nodes that has a minimum resource utilization conflict among the nodes in the list of nodes with a resource lock held by a previous node, wherein a resource utilization conflict with the resource lock held by the previous node exists if a resource used by the previous node is locked by the resource lock when the resource is needed during execution of the next node, and inserting the task of the plurality of tasks represented by the next node into the execution order.

8. The system of claim 7, the operations further comprising:

removing the next node and any corresponding directed edges from the graph;

repeating the selecting, determining, removing, and inserting until there are no nodes in the graph; and executing the plurality of tasks according to the execution order.

9. The system of claim 7, wherein a first plurality of nodes from the list of nodes have equally minimum resource utilization conflicts with the resource lock held by the previous node, the determining further comprising:

determining the next node from the first plurality of nodes having a greatest number of child nodes.

10. The system of claim 9, wherein a second plurality of nodes from the first plurality of nodes have an equal greatest number of child nodes, the determining further comprising:

determining the next node from the second plurality of nodes that forces early resolution of a future resource utilization conflict.

11. The system of claim 10, wherein a third plurality of nodes from the second plurality of nodes equally force the early resolution of the future resource utilization conflict, the determining further comprising:

determining the next node from the third plurality of nodes that was placed into the graph first.

12. The system of claim 7, wherein each of the plurality of tasks correspond to a software installation.

13. A computer readable storage device having instructions stored thereon for resolving an execution order for a plurality of tasks, execution of the instructions which, by one or more processing devices, causes the one or more processing devices to perform operations comprising:

selecting a list of nodes having no incoming directed edges from a graph comprising a plurality of nodes and one or more directed edges connecting out from parent nodes of the plurality of nodes into respective child nodes of the plurality of nodes, wherein the directed edges specify a dependency by the child nodes on the respective parent nodes, and wherein each node represents a task of the plurality of tasks;

determining a next node from the list of nodes that has a minimum resource utilization conflict among the nodes in the list of nodes with a resource lock held by a previous node, wherein a resource utilization conflict with the resource lock held by the previous node exists if a resource used by the previous node is locked by the resource lock when the resource is needed during execution of the next node; and inserting the task of the plurality of tasks represented by the next node into the execution order.

14. The computer readable storage device of claim 13, the operations further comprising:

removing the next node and any corresponding directed edges from the graph;

repeating the selecting, determining, removing, and inserting until there are no nodes in the graph; and executing the plurality of tasks according to the execution order.

15. The computer readable storage device of claim 13, wherein a first plurality of nodes from the list of nodes have equally minimum resource utilization conflicts with the resource lock held by the previous node, the determining further comprising:

determining the next node from the first plurality of nodes having a greatest number of child nodes.

16. The computer readable storage device of claim 15, wherein a second plurality of nodes from the first plurality of nodes have an equal greatest number of child nodes, the determining further comprising:

determining the next node from the second plurality of nodes that forces early resolution of a future resource utilization conflict.

17. The computer readable storage device of claim 16, wherein a third plurality of nodes from the second plurality of nodes equally force the early resolution of the future resource utilization conflict, the determining further comprising:

determining the next node from the third plurality of nodes that was placed into the graph first.

* * * * *